United States Patent
Schartner

(10) Patent No.: US 10,449,615 B2
(45) Date of Patent: Oct. 22, 2019

(54) HYBRID WELDING MODULES

(71) Applicant: Illinois Tool Works Inc., Glenview, IL (US)

(72) Inventor: Quinn William Schartner, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 528 days.

(21) Appl. No.: 15/338,859

(22) Filed: Oct. 31, 2016

(65) Prior Publication Data
US 2018/0117698 A1 May 3, 2018

(51) Int. Cl.
*B23K 9/00* (2006.01)
*B23K 9/10* (2006.01)
(Continued)

(52) U.S. Cl.
CPC .......... *B23K 9/1043* (2013.01); *B23K 9/0953* (2013.01); *B23K 9/0956* (2013.01);
(Continued)

(58) Field of Classification Search
CPC .. B23K 9/1043; B23K 9/0953; B23K 9/0956; B23K 9/1012; B23K 9/1056; B23K 9/1081; B23K 9/16
(Continued)

(56) References Cited

U.S. PATENT DOCUMENTS 6,225,596 B1 * 5/2001 Chandler ............. B23K 9/1056
219/130.1
6,414,267 B1 * 7/2002 Reynolds ............. B23K 9/1043
219/130.1
(Continued)

FOREIGN PATENT DOCUMENTS

CN 103128419 6/2013

OTHER PUBLICATIONS

Int'l Search Report and Written Opinion for PCT/US2017/058956 dated Apr. 5, 2018 (14 pgs.).

*Primary Examiner* — Viet Le
(74) *Attorney, Agent, or Firm* — McAndrews, Held & Malloy, Ltd.

(57) ABSTRACT

Hybrid welding modules are disclosed. An example hybrid welding module includes a welding input switch, an energy storage input switch, an energy storage output switching circuit, and a control circuit. The welding input switch receives welding-type input power and selectively outputs the welding-type input power to a weld circuit as first welding-type output power. The energy storage input switch receives the welding-type input power and selectively conducts the welding-type input power to an energy storage device. The energy storage output switching circuit converts energy output by the energy storage device to second welding-type power and outputs the second welding-type power to the weld circuit. The control circuit enables charging of the energy storage device by controlling the energy storage input switch to output the welding-type input power to the energy storage device, selectively controls the welding input switch to output the welding-type input power to the weld circuit, determines a commanded total welding-type current, monitors a first welding-type current through the welding input switch, monitors a second welding-type current output by the energy storage output switching circuit, and controls the energy storage output switching circuit to output the second welding-type power for combination with the first welding-type output power based on the commanded total welding-type current, the first welding-type current, and the second welding-type current.

20 Claims, 13 Drawing Sheets

(51) Int. Cl.
*B23K 9/095* (2006.01)
*B23K 9/16* (2006.01)

(52) U.S. Cl.
CPC .......... *B23K 9/1012* (2013.01); *B23K 9/1056* (2013.01); *B23K 9/1081* (2013.01); *B23K 9/16* (2013.01)

(58) Field of Classification Search
USPC ............... 219/130–130.51, 133, 134, 137 PS
See application file for complete search history.

(56) References Cited

U.S. PATENT DOCUMENTS

| | | | | |
|---|---|---|---|---|
| 6,479,794 B1* | 11/2002 | Sykes | .................. | B23K 9/1006 219/133 |
| 6,504,132 B1* | 1/2003 | Church | .................. | B23K 9/091 219/130.1 |
| 6,512,199 B1* | 1/2003 | Blazina | .................. | B23K 9/1056 219/132 |
| 6,586,700 B2* | 7/2003 | Fortain | .................. | B23K 9/164 219/137 PS |
| 6,608,285 B2* | 8/2003 | Lefebvre | .................. | B23K 9/025 219/137 R |
| 6,777,649 B2* | 8/2004 | Reynolds | .................. | B23K 9/1081 219/130.1 |
| 6,818,860 B1* | 11/2004 | Stava | .................. | B23K 9/1006 219/130.1 |
| 6,940,037 B1* | 9/2005 | Kovacevic | .................. | B23K 9/044 219/121.64 |
| 6,982,398 B2* | 1/2006 | Albrecht | .................. | B23K 9/1006 219/133 |
| 7,119,450 B2* | 10/2006 | Albrecht | .................. | B64F 1/34 290/1 A |
| 7,183,517 B2* | 2/2007 | Albrecht | .................. | B23K 9/1056 219/130.4 |
| 7,202,636 B2* | 4/2007 | Reynolds | .................. | H02J 7/022 320/166 |
| 7,446,503 B2* | 11/2008 | Stanzel | .................. | H02J 7/022 320/128 |
| D611,074 S * | 3/2010 | Bashore | .................. | D15/144 |
| 7,690,850 B2* | 4/2010 | Kossat | .................. | G02B 6/2551 219/121.45 |
| 7,750,600 B2 | 7/2010 | Stanzel et al. | | |
| 7,777,447 B2* | 8/2010 | Vogel | .................. | B23K 9/1081 219/130.4 |
| 7,795,840 B2* | 9/2010 | Vogel | .................. | H02J 7/00 320/107 |
| 7,838,797 B2 | 11/2010 | Albrecht | | |
| 7,868,588 B2* | 1/2011 | Altekruse | .................. | H02J 7/0042 320/109 |
| 8,080,761 B2* | 12/2011 | Matthews | .................. | B23K 9/1006 219/130.1 |
| 8,203,099 B2* | 6/2012 | Peters | .................. | B23K 9/04 219/130.51 |
| 8,405,001 B2* | 3/2013 | Albrecht | .................. | B23K 9/1006 219/108 |
| 8,415,588 B2 | 4/2013 | Albrecht | | |
| 8,476,555 B2* | 7/2013 | Diedrick | .................. | B23K 9/1336 219/137.2 |
| 8,507,830 B2 | 8/2013 | Albrecht | | |
| 8,558,139 B2 | 10/2013 | Albrecht | | |
| 8,569,652 B2* | 10/2013 | Albrecht | .................. | B23K 9/1006 219/133 |
| 8,640,799 B2* | 2/2014 | Beeson | .................. | B23K 9/1006 180/53.5 |
| 8,735,775 B2* | 5/2014 | Kaufman | .................. | B23K 9/124 219/130.01 |
| 8,759,714 B2* | 6/2014 | Fosbinder | .................. | B23K 9/10 219/130.21 |
| 8,791,388 B2 | 7/2014 | Albrecht | | |
| 8,803,032 B2 | 8/2014 | Matthews et al. | | |
| 8,841,583 B2 | 9/2014 | Albrecht | | |
| 8,884,189 B2* | 11/2014 | Borchert | .................. | B23K 9/1006 219/137 PS |
| 8,969,762 B2* | 3/2015 | Beeson | .................. | B23K 9/1006 219/130.1 |
| 9,254,534 B2* | 2/2016 | Magerl | .................. | B23K 9/1043 |
| 9,278,403 B2 | 3/2016 | Albrecht | | |
| 9,302,339 B2* | 4/2016 | Burkhart | .................. | B23K 9/1006 |
| 9,333,583 B2 | 5/2016 | Beeson | | |
| 2002/0144989 A1* | 10/2002 | Sammons | .................. | B23K 9/1056 219/137 PS |
| 2002/0158056 A1* | 10/2002 | Ho | .................. | B23K 9/1006 219/132 |
| 2003/0155339 A1* | 8/2003 | Gitter | .................. | B23K 9/1006 219/133 |
| 2004/0004065 A1* | 1/2004 | Bankstahl | .................. | B23K 7/10 219/133 |
| 2004/0084429 A1* | 5/2004 | Achtner | .................. | B23K 9/1006 219/130.1 |
| 2004/0099649 A1* | 5/2004 | DeCoster | .................. | B23K 9/06 219/130.21 |
| 2004/0140302 A1* | 7/2004 | Myers | .................. | B23K 9/0253 219/130.51 |
| 2005/0006364 A1* | 1/2005 | Blankenship | .................. | B23K 9/091 219/130.1 |
| 2005/0051524 A1* | 3/2005 | Blankenship | .................. | B23K 9/1062 219/130.51 |
| 2005/0127054 A1* | 6/2005 | Houston | .................. | B23K 9/091 219/130.51 |
| 2005/0189334 A1* | 9/2005 | Stava | .................. | B23K 9/092 219/130.51 |
| 2005/0242076 A1* | 11/2005 | Stava | .................. | B23K 9/1068 219/130.5 |
| 2006/0037952 A1* | 2/2006 | Myers | .................. | B23K 9/093 219/130.51 |
| 2006/0070983 A1* | 4/2006 | Narayanan | .................. | B23K 9/092 219/130.51 |
| 2007/0108174 A1* | 5/2007 | Narayanan | .................. | B23K 9/0282 219/137 PS |
| 2007/0181547 A1* | 8/2007 | Vogel | .................. | B23K 9/1081 219/130.1 |
| 2007/0187376 A1* | 8/2007 | Albrecht | .................. | B23K 9/1056 219/130.1 |
| 2007/0215585 A1* | 9/2007 | O'Connor | .................. | B23K 9/1081 219/130.1 |
| 2008/0087653 A1* | 4/2008 | Furman | .................. | B23K 9/10 219/130.21 |
| 2008/0264922 A1* | 10/2008 | Fosbinder | .................. | B23K 9/1006 219/133 |
| 2008/0314885 A1* | 12/2008 | Hutchison | .................. | B23K 9/1043 219/133 |
| 2009/0026173 A1* | 1/2009 | Arnett | .................. | B08B 15/02 219/74 |
| 2009/0057285 A1* | 3/2009 | Bashore | .................. | B23K 9/32 219/130.1 |
| 2009/0313549 A1* | 12/2009 | Casner | .................. | B23K 9/0953 715/740 |
| 2010/0193489 A1* | 8/2010 | Beeson | .................. | B23K 9/1056 219/133 |
| 2010/0326962 A1* | 12/2010 | Calla | .................. | B23K 9/0956 219/76.14 |
| 2011/0114608 A1* | 5/2011 | Albrecht | .................. | B23K 9/1006 219/112 |
| 2011/0309062 A1* | 12/2011 | O'Donnell | .................. | B23K 9/1043 219/130.1 |
| 2012/0006792 A1* | 1/2012 | Rozmarynowski | .... | B23K 9/327 219/74 |
| 2012/0095941 A1* | 4/2012 | Dolson | .................. | B23K 9/0953 705/400 |
| 2012/0138586 A1* | 6/2012 | Webster | .................. | A61B 18/20 219/121.64 |
| 2012/0138587 A1* | 6/2012 | Fosbinder | .................. | B23K 9/1006 219/133 |
| 2012/0175356 A1* | 7/2012 | Magerl | .................. | B23K 9/32 219/130.21 |
| 2012/0241430 A1* | 9/2012 | Luck | .................. | B23K 9/1006 219/137.7 |

(56) References Cited

U.S. PATENT DOCUMENTS

| | | | |
|---|---|---|---|
| 2013/0119040 A1* | 5/2013 | Suraba | B23K 9/0953 219/137 R |
| 2013/0263420 A1* | 10/2013 | Shipulski | B23K 9/16 29/407.01 |
| 2013/0264317 A1* | 10/2013 | Hoffa | B23K 10/006 219/121.53 |
| 2013/0264320 A1* | 10/2013 | Shipulski | H05H 1/34 219/130.01 |
| 2014/0001167 A1* | 1/2014 | Bunker | B23K 9/1043 219/130.21 |
| 2014/0027428 A1* | 1/2014 | DuVal | B23K 9/1006 219/133 |
| 2014/0054276 A1 | 2/2014 | Albrecht et al. | |
| 2014/0131329 A1* | 5/2014 | Meckler | B23K 9/095 219/130.1 |
| 2014/0238965 A1* | 8/2014 | Spisic | B23K 9/1006 219/132 |
| 2014/0263238 A1* | 9/2014 | Ulrich | B23K 9/095 219/130.21 |
| 2014/0263245 A1* | 9/2014 | Ulrich | B23K 9/1075 219/133 |
| 2014/0299589 A1 | 10/2014 | Fosbinder | |
| 2015/0021892 A1* | 1/2015 | Moss | B23K 9/032 280/785 |
| 2015/0069975 A1* | 3/2015 | Farah | H02J 7/0019 320/150 |
| 2015/0072182 A1* | 3/2015 | Maglietta | H05K 5/0213 429/50 |
| 2015/0083701 A1* | 3/2015 | Burkhart | B23K 9/1081 219/133 |
| 2015/0174693 A1* | 6/2015 | Astle | B23K 11/26 219/111 |
| 2015/0183043 A1* | 7/2015 | Starzengruber | B23K 9/1043 219/130.1 |
| 2015/0249349 A1* | 9/2015 | Binder | H01M 10/06 320/107 |
| 2015/0290735 A1* | 10/2015 | Beattie | B23K 9/0325 700/166 |
| 2015/0314387 A1* | 11/2015 | Starzengruber | B23K 9/1043 219/130.33 |
| 2016/0105935 A1* | 4/2016 | Jones | H05B 11/00 219/601 |
| 2016/0214200 A1* | 7/2016 | Beeson | B23K 9/0953 |
| 2017/0001268 A1* | 1/2017 | Jack | B23K 37/0229 |
| 2017/0050254 A1* | 2/2017 | Holverson | B29C 64/112 |
| 2018/0126477 A1* | 5/2018 | Kooken | B23K 9/0956 |
| 2018/0373225 A1* | 12/2018 | Worthing, Jr. | B23K 9/1062 |
| 2019/0030634 A1* | 1/2019 | Henry | B23K 9/1043 |
| 2019/0126380 A1* | 5/2019 | Gharib | B23K 9/091 |

* cited by examiner

HYBRID WELDING MODULES

BACKGROUND

The invention relates generally to welding systems, and more particularly to hybrid welding modules.

Conventional welding power supplies are limited to their rated output. In some cases, battery-assisted systems have been used to increase the capacity of welding power supplies. However, conventional battery assisted systems are either integrated with the welding power supply or require the welding power supply to be reconfigured between charging the battery and welding.

SUMMARY

Hybrid welding modules are disclosed, substantially as illustrated by and described in connection with at least one of the figures, as set forth more completely in the claims.

DETAILED DESCRIPTION

Figure 1:
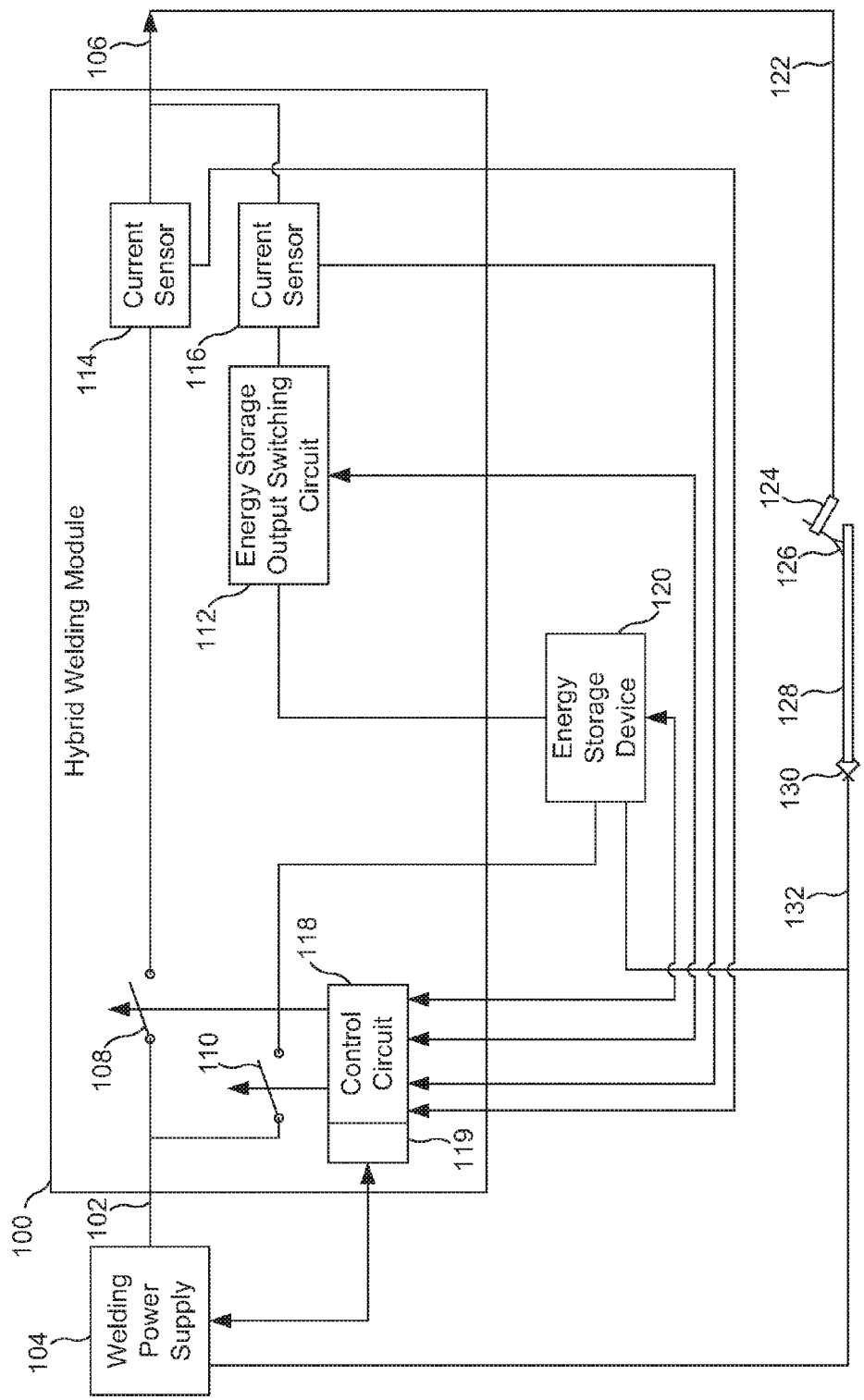
FIG. 1 is a block diagram of an example hybrid welding module in accordance with aspects of this disclosure.

Disclosed example hybrid welding modules receive welding-type input power from a welding power supply and output hybrid welding power, which may include the welding-type input power and/or supplemental welding-type power. Example hybrid welding modules operate in a welding mode, charging mode, a combination welding-charging mode, a welding boost mode, and/or a discharge mode.

In disclosed examples, the hybrid welding module charges an energy storage device using the welding-type input power from the welding power supply while a welding operation is not occurring and/or using a portion of the welding-type input power to charge the energy storage device while a welding operation is occurring. The stored energy in the energy storage device may then be used to supplement the welding-type power from the welding power supply to increase the available power for welding operations.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit" includes any analog and/or digital components, power and/or control elements, such as a microprocessor, digital signal processor (DSP), software, and the like, discrete and/or integrated components, or portions and/or combinations thereof.

As used herein, the term "primary" means "preferred" or "first." As used herein, "secondary" or "supplemental" refers to an entity that less preferred or occurring after the primary entity. For example, primary welding current may be preferred to secondary or supplemental welding current, and the secondary/supplemental welding current is used to boost the primary current and/or when the primary current is not used. While disclosed examples refer primary and secondary entities for descriptive purposes, this disclosure is not limited to having primary and secondary entities in all instances.

Disclosed example hybrid welding modules include a welding input switch, an energy storage input switch, an energy storage output switching circuit, and a control circuit. The welding input switch receives welding-type input power and selectively outputs the welding-type input power to a weld circuit as first welding-type output power. The energy storage input switch receives the welding-type input power and selectively conducts the welding-type input power to an energy storage device. The energy storage output switching circuit converts energy output by the energy storage device to second welding-type power and outputs the second welding-type power to the weld circuit. The control circuit enables charging of the energy storage device by controlling the energy storage input switch to output the welding-type input power to the energy storage device and selectively controlling the welding input switch to output the welding-type input power to the weld circuit. The control circuit determines a commanded total welding-type current, monitors a first welding-type current through the welding input switch, monitors a second welding-type current output by the energy storage output switching circuit, and controls the energy storage output switching circuit to output the second welding-type power for combination with the first welding-type output power based on the commanded total welding-type current, the first welding-type current, and the second welding-type current.

Disclosed example hybrid welding modules further include a control interface to receive a communication from a welding-type power supply providing the welding-type input power. The communication includes one or more weld parameters, and the control circuit determines the commanded total welding-type current based on the one or more weld parameters. In some such examples, the commanded total welding-type current is greater than a rated current output of the welding-type power supply.

Some examples further include a control interface to communicate with a welding-type power supply providing the welding-type input power, where the control circuit transmits a communication to the welding-type power supply to cause the welding-type power supply to provide the welding-type input power while charging the energy storage device and while the welding input switch is controlled to not output the welding-type input power to the weld circuit. In some such examples, the control circuit controls the energy storage output switching circuit based on a voltage-amperage curve without changes to the welding-type input power by the welding-type power supply. In some examples, the control circuit detects an end of a welding-type operation based on monitoring the first welding-type current and, in response to detecting the end of the welding-type operation, enables the charging of the energy storage device and transmits the communication to the welding-type power supply.

In some examples, the control circuit controls the energy storage output switching circuit to control a voltage-amperage curve of the second welding-type power. In some examples, the control circuit controls the energy storage output switching circuit to adjust a total welding-type output power based on a voltage-amperage curve, the first welding-type current, and the second welding-type current. In some examples, the energy storage output switching circuit includes a boost converter to increase a voltage from the energy storage device. In some examples, the energy storage output switching circuit includes a buck converter to increase a voltage from the energy storage device.

In some example hybrid welding modules, the control circuit controls the energy storage output switching circuit based on a difference between the commanded total welding-type current and the first welding-type current. In some examples, the energy storage output switching circuit includes a buck circuit and a boost circuit, and the control circuit controls the energy storage output switching circuit by controlling at least one of the boost circuit or the buck circuit. In some examples, the control circuit controls the energy storage output switching circuit to output an open circuit voltage when the first welding type input switch is open.

In some example hybrid welding modules, the control circuit controls the energy storage output switching circuit to provide initial power to the weld circuit during a start of a weld. In some such examples, the control circuit controls the welding input switch to output at least a portion of the welding-type input power to the weld circuit after the start of the weld. In some examples, the control circuit communicates with a welding-type power supply provides the welding-type input power to determine whether to control the energy storage output switching circuit to energize the weld circuit. In some such examples, the control circuit determines that the energy storage output switching circuit is to energize the weld circuit based on at least one of receiving an indication of a welding process type or receiving a remote trigger signal.

Some example hybrid welding modules further include a charging circuit to charge the energy storage device using the welding-type input power. Some such examples further include an external energy storage device connection. The control circuit identifies one or more characteristics of the energy storage device and controls the charging circuit and the energy storage output switching circuit based on the one or more characteristics. In some such examples, the one or more characteristics include a nominal output voltage of the energy storage device when the energy storage device is a battery.

In some examples, the energy storage device is installed in the hybrid welding module, and the energy storage device includes a capacitor and/or a battery. In some examples, the control circuit monitors the first welding-type current through the welding input switch based on at least one of a current sensor coupled to the welding input switch or current output information from the welding-type power supply.

Disclosed example hybrid welding modules include a charging circuit, a multi-output power input switch, an energy storage output switching circuit, and a control circuit. The charging circuit charges an energy storage device. The multi-output power input switch receives welding-type input power, selectively outputs the welding-type input power to a weld circuit as first welding-type output power, and selectively outputs the welding-type input power to the charging circuit. The charging circuit charges the energy storage device using the welding-type input power. The energy storage output switching circuit converts energy output by the energy storage device to second welding-type power and outputs the second welding-type power to the weld circuit. The control circuit enables charging of the energy storage device by controlling the multi-output power input switch to output the welding-type input power to the charging circuit. The control circuit enables welding by controlling the multi-output power input switch to output the welding-type input power to the weld circuit. The control circuit determines a commanded total welding-type power, monitors a first welding-type current output by the multi-output power input switch to the weld circuit, monitors a second welding-type current output by the energy storage output switching circuit, and controls the energy storage output switching circuit to output the second welding-type power for combination with the first welding-type output power based on the commanded total welding-type power, the first welding-type current, and the second welding-type current.

Disclosed example hybrid welding modules include a welding input switch, a battery, a charging circuit, a battery input switch, a battery output switching circuit, and a control circuit. The welding input switch receives welding-type input power and selectively outputs the welding-type input power to a weld circuit as first welding-type output power. The charging circuit charges the battery using the welding-type input power. The battery input switch receives the welding-type input power and selectively outputs the welding-type input power to the charging circuit. The battery output switching circuit converts energy output by the battery to second welding-type power and outputs the second welding-type power to the weld circuit. The control circuit enables charging of the battery by controlling the welding input switch and the battery input switch to output the welding-type input power to the charging circuit. The control circuit enables welding by controlling the welding input switch and the battery input switch to output the welding-type input power to the weld circuit. The control circuit determines a commanded total welding-type current, monitors a first welding-type current through the welding input switch, monitors a second welding-type current output by the battery output switching circuit, and controls the battery output switching circuit to output the second welding-type power for combination with the first welding-type output power based on the commanded total welding-type current, the first welding-type current, and the second welding-type current.

FIG. 1 is a block diagram of an example hybrid welding module 100. The example hybrid welding module 100 of FIG. 1 is coupled to a welding-type input power 102 output by a welding power supply 104 and is configured to output a hybrid welding-type output 106. The welding-type input power 102 is a welding-type output from the welding power supply 104. The example hybrid welding module 100 of FIG. 1 includes a welding input switch 108, an energy storage input switch 110, an energy storage output switching circuit 112, current sensors 114, 116, and a control circuit 118. The example hybrid welding module 100 is also connected to an energy storage device 120, such as a capacitor or a battery. As described in more detail below, the hybrid welding module 100 may charge the energy storage device 120 using the welding-type input power 102 output by the welding power supply 104 and/or output energy from the energy storage device 120 to the hybrid welding-type output 106, either alone or in combination with the welding-type input power 102.

The welding input switch 108 receives the welding-type input power 102 and selectively outputs the welding-type input power 102 to a weld circuit (e.g., the hybrid welding-type output 106) as first welding-type output power. The hybrid welding module 100 is an intermediary in the weld circuit, which includes the welding-type input power 102 and/or the hybrid welding-type output 106. The weld circuit may further include, for example, a weld cable 122, a welding torch 124, a welding arc 126, a workpiece 128, a work clamp 130, and/or a work cable 132 coupled to the welding power supply 104. The energy storage device 120 is connected to the welding power supply 104 via a return connection 134, which is connected to the workpiece 128 in the example of FIG. 1. However, the return connection 134 may follow or be connected to any other return path, such as by a separate cable to the welding power supply 104, via the hybrid welding module 100 using one or more cables, and/or any other path.

The energy storage input switch 110 also receives the welding-type input power 102 and selectively conducts the welding-type input power 102 to the energy storage device 120. The welding input switch 108 and the energy storage input switch 110 may be implemented using power semiconductors, electromechanical devices, and/or any other type(s) and/or combinations of switching device.

The energy storage output switching circuit 112 converts energy output by the energy storage device 120 to second welding-type power. The energy storage output switching circuit 112 outputs the second welding-type power to the weld circuit. The energy storage output switching circuit 112 may include a boost converter, a buck converter, a boost-buck converter, a buck-boost converter, and/or any other type of DC-DC converter circuit to increase and/or decrease the voltage from the voltage of the energy storage device 120 to a welding-type voltage (e.g., a commanded voltage at the hybrid welding-type output 106).

The control circuit 118 communicates with the welding power supply 104 via a control interface 119 to control the welding power supply 104 and/or receive data from the welding power supply 104. The control circuit 118 further controls the welding input switch 108, the energy storage input switch 110, and/or the energy storage output switching circuit 112. The control circuit 118 receives data from the energy storage output switching circuit 112, the current sensors 114, 116, and/or the energy storage device 120.

The control circuit 118 enables charging of the energy storage device 120 by controlling the energy storage input switch 110 to output the welding-type input power to the energy storage device 120.

The control circuit 118 also selectively controls the welding input switch 108 to output the welding-type input power 102 (e.g., the hybrid welding-type output 106) and/or to stop outputting the welding-type input power 102.

Figure 11A:
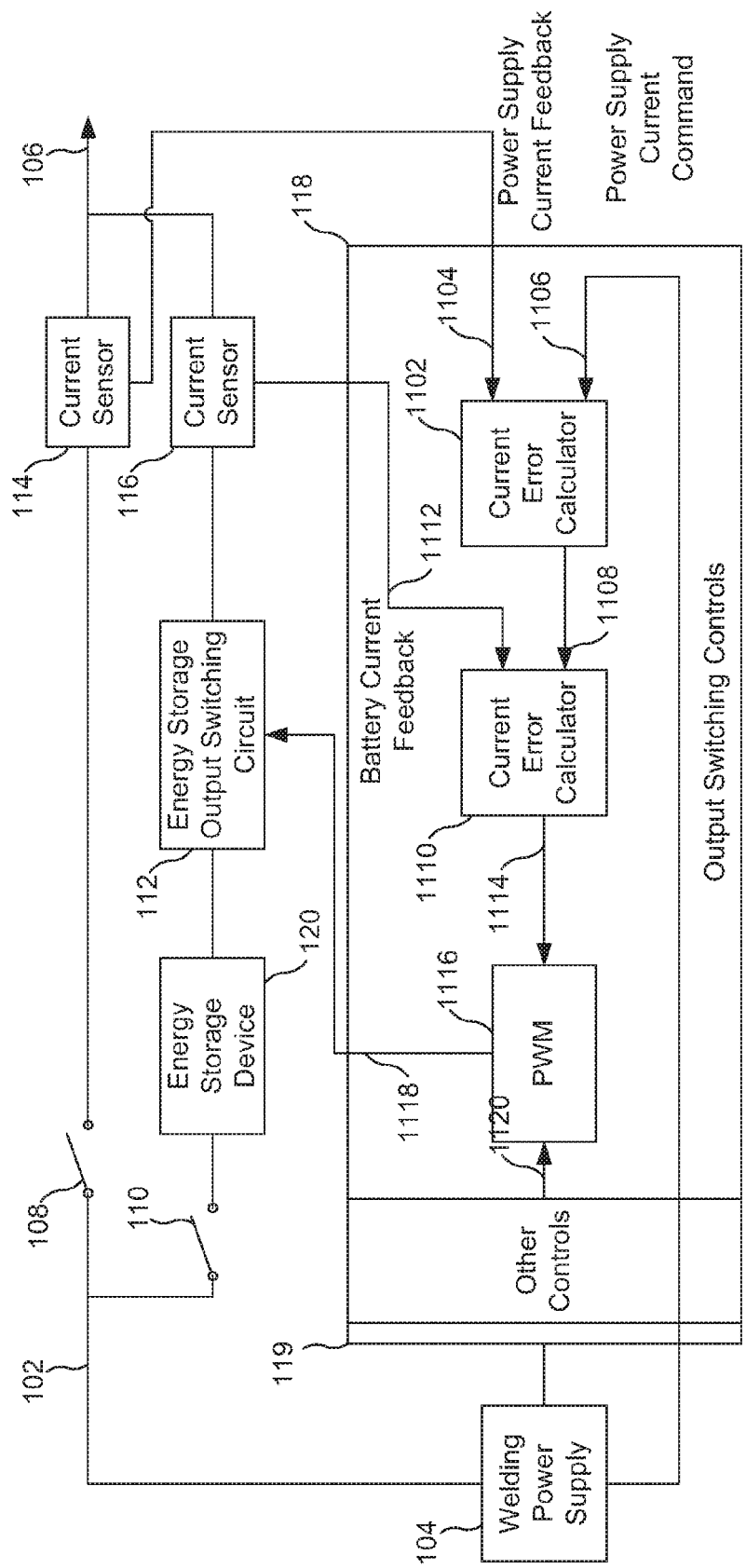
FIG. 11A illustrates an example in which the control circuit causes the hybrid welding module to enter the Welding Boost Mode by monitoring the current sensor and comparing the current measured by the current sensor to a commanded current for the weld.
Figure 11B:
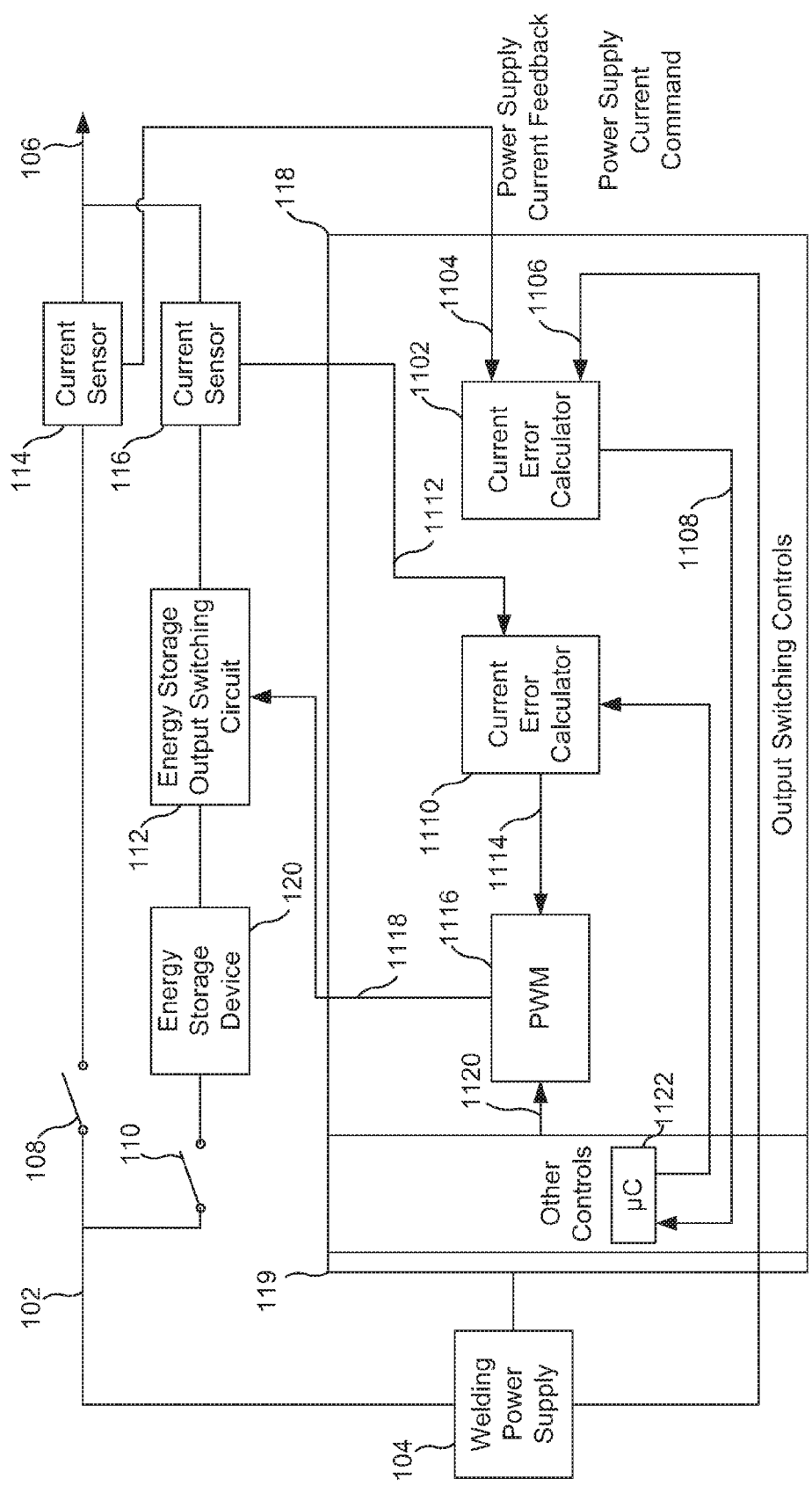
FIG. 11B illustrates an example in which the control circuit controls the energy storage output switching circuit based on the temperature, charge state, and/or other characteristics of the energy storage device.

The control interface 119 receives communication(s) from the welding power supply 104 providing the welding-type input power 102. Example communications may include current or voltage feedback from the welding type input and/or one or more weld parameters, such as commanded current and/or commanded voltage used by the welding power supply 104 to control the welding-type input power 102. As shown in FIGS. 11A and 11B, the control circuit 118 determines the commanded total welding-type current based on the one or more weld parameters, and controls the energy storage output switching circuit 112 based on the commanded total welding-type current, the actual current communicated from the welding power supply 104, the actual current measured by the current sensor 114, and/or the actual current measured by the current sensor 116. In some examples, the commanded total welding-type current is greater than a rated current output of the welding power supply 104. In some examples, the commanded total welding-type current may exceed a rated current output of the welding power supply 104. As described in more detail below, the hybrid welding module 100 may output power to enable the total current to exceed the rated current output of the welding power supply 104.

Additionally or alternatively, the control interface 119 communicates with the welding power supply 104 to transmit a communication from the control circuit 118 to the welding power supply 104. Example communications from the control circuit 118 cause the welding power supply 104 to provide the welding-type input power while charging the energy storage device 120 and while the welding input switch 108 is controlled to not output the welding-type input power 102 to the weld circuit (e.g., the welding input switch 108 is in an open configuration) and/or while the welding input switch 108 in a closed configuration but no welding is occurring. The control circuit 118 may control the welding input switch 108 to be in an open configuration, for example, to enable the welding power supply 104 to provide the welding-type input power 102 but avoid a situation in which a welding torch coupled to the hybrid welding-type output 106 is energized while an operator does not expect the welding torch to be energized. In some examples, the control circuit 118 determines that the energy storage output switching circuit 112 is to energize the weld circuit based on receiving an indication of a welding process type and/or in response to receiving a remote trigger signal.

By communicating with the welding power supply 104, the control circuit 118 is enabled to control the energy storage output switching circuit 112 based on a V-I curve without changes to the welding-type input power 102 by the welding power supply 104. Additionally or alternatively, the control circuit 118 can detect an end of a welding-type operation based on the communication interface 119 and/or by monitoring the welding-type current via the current sensor 114 and, in response to detecting the end of the welding-type operation, enable the charging of the energy storage device 120 and/or transmit the communication to the welding power supply 104 to command the welding power supply 104 to continue outputting the welding-type input power 102. The control circuit 118 can achieve a faster response to changes in the load at the hybrid welding-type output 106 than the welding power supply 104 for engine-driven welders. The hybrid welding module 100 also provides advantages when used with other types of welding power supplies, such as extending the welding load capacity of the power supply and/or improving weld performance.

Based on the commanded total welding-type current, the first welding-type current, and the second welding-type current, the control circuit 118 may control the energy storage output switching circuit 112 to output the second welding-type power for combination with the first welding-type output power to boost the available welding power at the hybrid welding-type output 106. In this manner, the control circuit 118 can selectively provide additional welding power to increase the output capacity of the welding power supply 104.

For example, when the load on the hybrid welding-type output 106 is satisfied by the welding type input power 102, the control circuit 118 may control the energy storage output switching circuit 112 to output the current to the hybrid welding-type output 106. When the load on the hybrid welding-type output 106 increases above a maximum load of the welding power supply 104, the energy storage output switching circuit 112 outputs supplemental current using energy supplied from the energy storage device 120.

The control circuit 118 may command the welding power supply 104 to output the welding-type input power 102 to the hybrid welding module 100 to charge the energy storage device 120, even when welding is not occurring.

Figure 12:
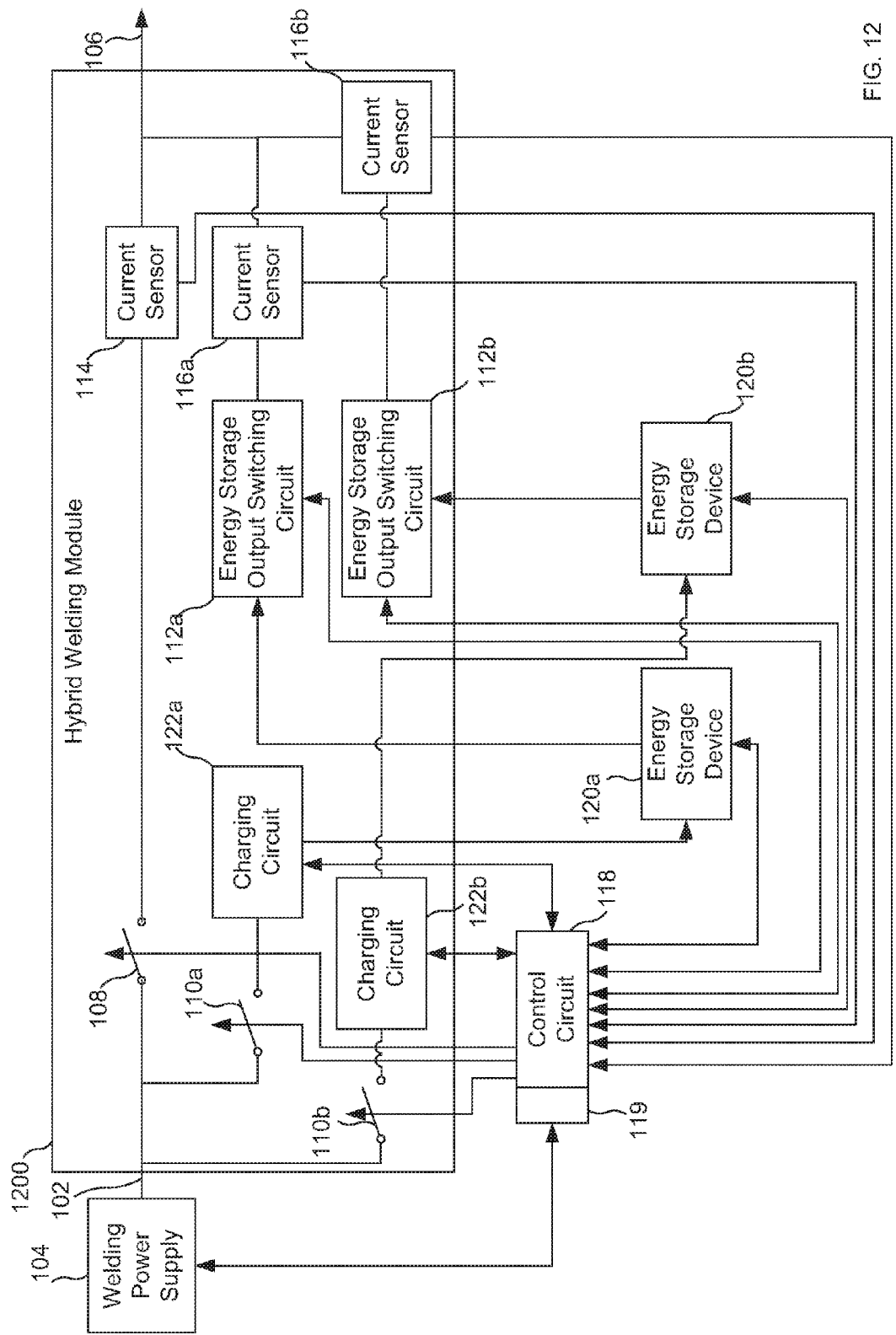
FIG. 12 illustrates an example hybrid welding module connected and/or disconnected to multiple energy storage devices.

As illustrated in FIG. 1, the energy storage device 120 is separate from the hybrid welding module 100. The hybrid welding module 100 may be connected and/or disconnected to the hybrid welding module 100 to enable an energy-depleted energy storage device to be swapped with a charged energy storage device. As illustrated in FIG. 12, the hybrid welding module 100 may also be connected and/or disconnected to multiple energy storage devices 120*a*, 120*b* to extend the energy capacity and/or the welding output range, to reduce the weight of the energy storage devices while maintaining a same capacity, and/or to swap depleted and charged energy storage devices. In this case, multiple energy storage output switching circuits can be used to independently manage the state of charge and load balancing between the energy storage devices, to charge one or more energy storage devices while other energy storage devices are being used, and/or any combination of management, charging, and/or discharging functions.

Figure 2:
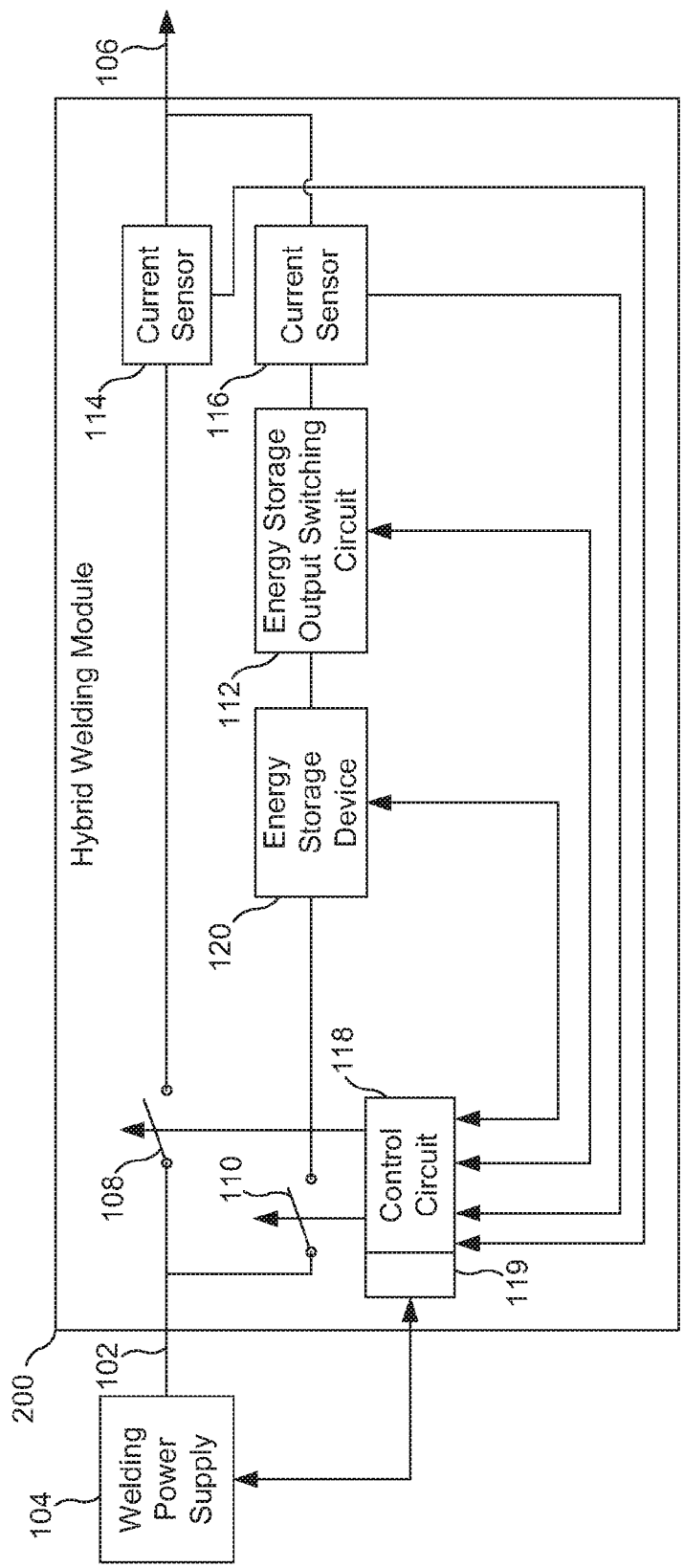
FIG. 2 is a block diagram of another example hybrid welding module in accordance with aspects of this disclosure.

FIG. 2 is a block diagram of another example hybrid welding module 200. The example hybrid welding module 200 of FIG. 2 is similar to the hybrid welding module 100 of FIG. 1, with the exception that the energy storage device 120 is integral with the hybrid welding module 200. The energy storage device 120 may be removable from the hybrid welding module 200 or may be affixed to the hybrid welding module 200.

In the example hybrid welding modules 100, 200 of FIGS. 1 and 2, the welding-type input power 102 is provided directly to the energy storage device 120 via the energy storage input switch 110. In these examples, to charge the energy storage device 120 with the welding-type input power 102, the welding-type input power 102 must provide a voltage higher than the voltage of the energy storage device 120. On the other hand, it is desirable to provide voltage to the energy storage output switching circuit 112 that is higher than the hybrid welding output 106 to supplement current to the output from the energy storage device 120. In some examples, the energy storage device 120 is a low voltage battery such that all welding power supplies will provide welding-type input power that is higher than the battery voltage, and include a boost-buck energy output switching circuit which boosts the battery voltage to a voltage higher than the maximum hybrid weld output voltage. Another example is disclosed below with reference to FIG. 3.

Figure 3:
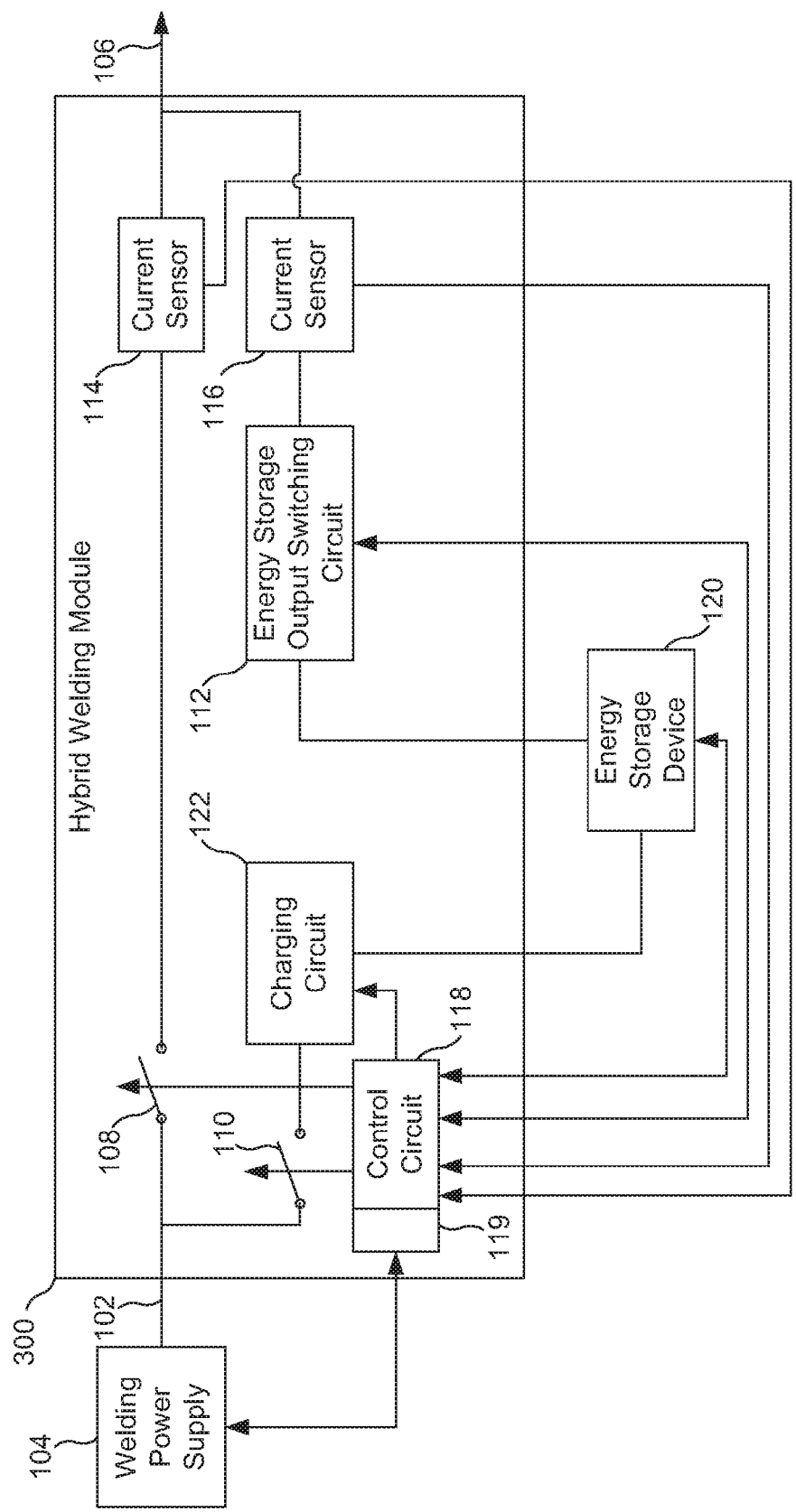
FIG. 3 is a block diagram of another example hybrid welding module in accordance with aspects of this disclosure.

FIG. 3 is a block diagram of another example hybrid welding module 300. In the example of FIG. 3, the energy storage device 120 is external to the hybrid welding module 300 and the hybrid welding module includes a charging circuit 122 coupled between the energy storage input switch 110 and the energy storage device 120. The example charging circuit 122 may, for example, increase a voltage from the voltage of the welding-type input power 102 to charge the energy storage device 120 when the energy storage device 120 has a higher voltage than the welding-type input power 102.

In some examples, the control circuit 118 controls the charging circuit 122 based on an output voltage of the energy storage device 120.

The control circuit 118 may identify one or more characteristics of the energy storage device 120. If the energy storage device 120 is an identifiable type of energy storage device, such as a battery pack designed and/or authorized for use with the hybrid welding module 100. Identified characteristics may include a model number of the energy storage device (e.g., a predefined type or model of battery pack), a charge state of the energy storage device 120, a nominal voltage of the energy storage device 120 (e.g., an output voltage when the energy storage device is charged to capacity), and/or any other characteristic. The control circuit 118 controls the charging circuit 122 and/or the energy storage output switching circuit 112 based on the identified characteristic(s).

Figure 4:
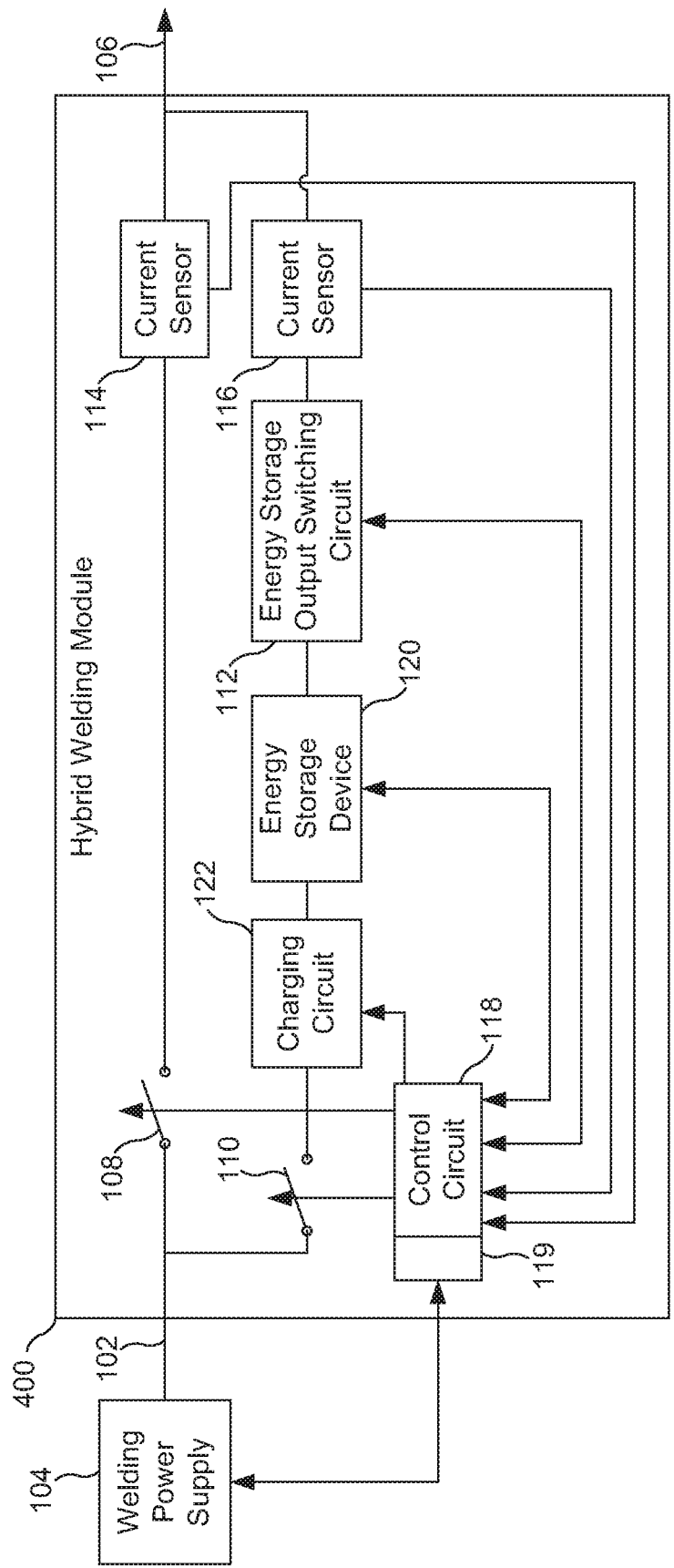
FIG. 4 is a block diagram of another example hybrid welding module in accordance with aspects of this disclosure.

FIG. 4 is a block diagram of another example hybrid welding module 400. The example hybrid welding module 400 includes the charging circuit 122 and the energy storage device 120 is integral to the hybrid welding module 400.

In any of the hybrid welding modules 100, 200, 300, 400, the control circuit 118 may control the energy storage output switching circuit 112 to control a voltage-amperage (V-I) curve of the second welding-type power. Additionally or alternatively, the control circuit 118 controls the energy storage output switching circuit 112 to adjust a total welding-type output power at the hybrid welding-type output 106 based on the V-I curve, the first welding-type current (measured at the current sensor 114), and the second welding-type current (measured at the current sensor 116).

FIGS. 5-10 below illustrate current flows during different modes of operation of the hybrid welding module 100 of FIG. 1. While FIGS. 5-10 are described below with reference to the hybrid welding module 100, the current flows illustrated in FIGS. 5, 6, 7, 8, 9, and/or 10 may additionally or alternatively occur during the same or similar welding modes for any of the welding modules 200, 300, 400 of FIGS. 2, 3, and/or 4.

Figure 5:
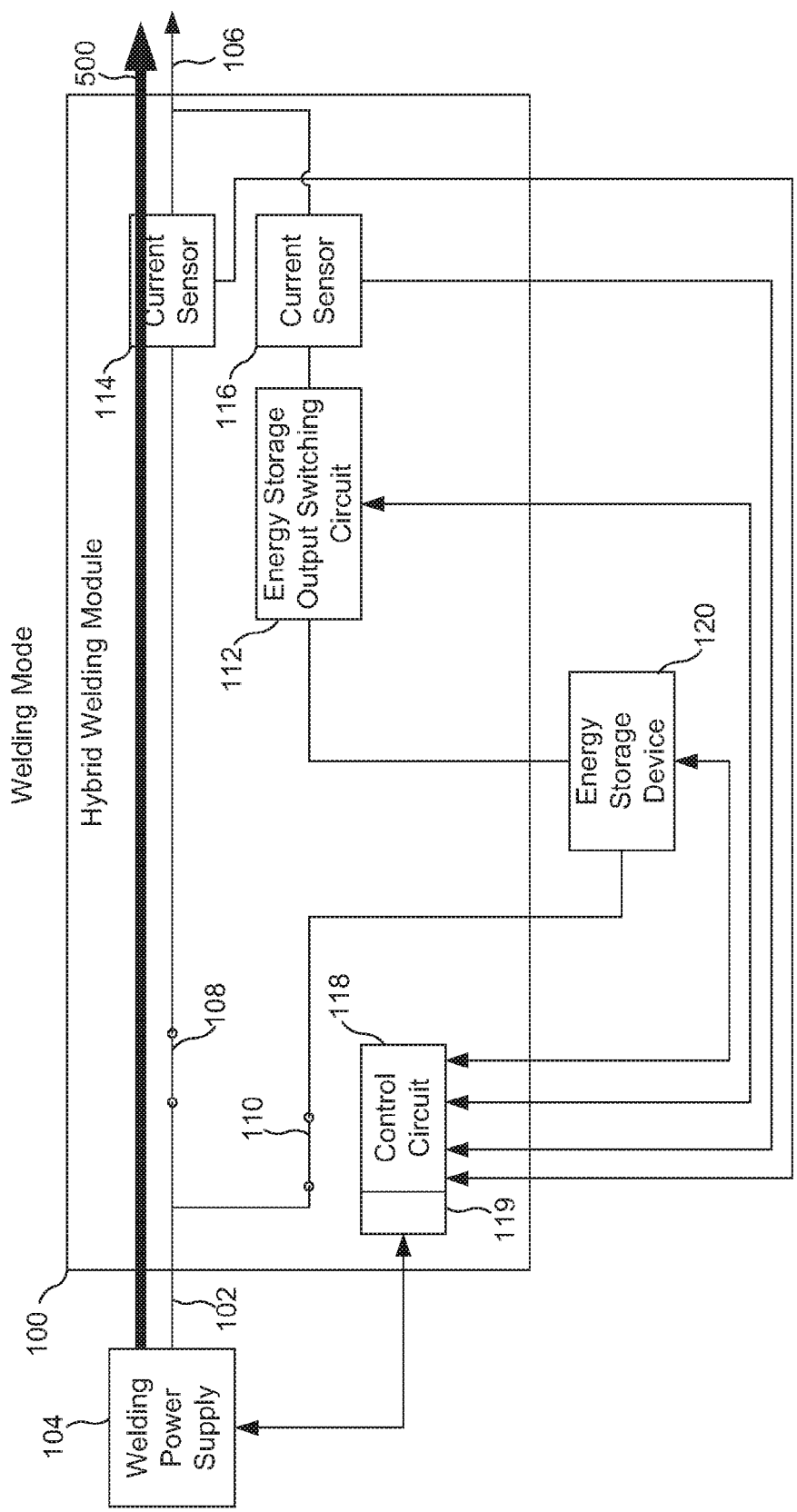
FIG. 5 illustrates current flow in the example hybrid welding module of FIG. 1 during a welding mode.

FIG. 5 illustrates current flow 500 in the example hybrid welding module 100 of FIG. 1 during a Welding Mode. In the Welding Mode, the energy storage input switch 110 is controlled to be open and the welding input switch 108 is controlled to be closed such that the welding-type input power 102 is passed through the hybrid welding module to the hybrid welding-type output 106. The hybrid welding module 100 does not charge the energy storage device 120 using the welding-type input power 102 and does not discharge the energy storage device 120 to output secondary or supplemental welding-type power to the hybrid welding-type output 106.

Figure 6:
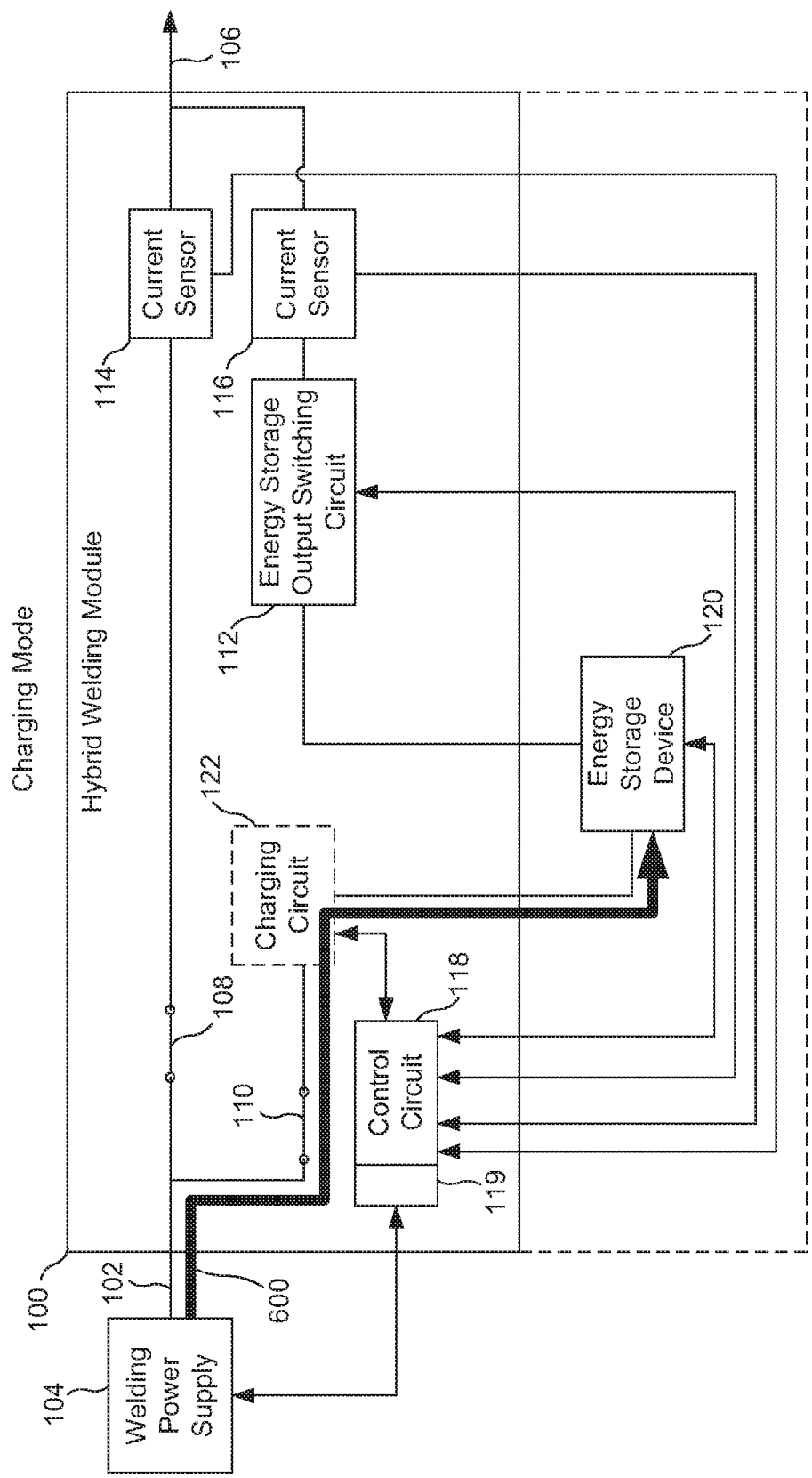
FIG. 6 illustrates current flow in the example hybrid welding module of FIG. 1 during a charging mode.

FIG. 6 illustrates current flow 600 in the example hybrid welding module 100 of FIG. 1 during a Charging Mode. In the Charging Mode, the control circuit 118 controls the energy storage input switch 110 to be in a closed configuration and controls the welding power supply 104 to output power, even if no welding operation is being conducted. The welding-type input power 102 received from the welding power supply 104 is directed to the energy storage device 120. As illustrated in FIG. 6, a charging circuit 122 may be provided and/or the energy storage device 120 may be integral to the hybrid welding module (e.g., as in the hybrid welding modules 200, 300, 400 of FIGS. 2, 3 and/or 4). If the charging circuit 122 is present, the charging circuit controls the current flow 600 to charge the energy storage device 120.

The example welding input switch 108 is illustrated in FIG. 6 as closed. For example, at the completion of a welding operation, the hybrid welding module 100 may transition from the welding mode and the current path 500 illustrated in FIG. 5 to the charging mode and the current path 600 shown in FIG. 6. However, the control circuit 118 may force the hybrid welding module 100 to perform charging (e.g., disabling pass through of the welding-type input power 102) by controlling the welding input switch 108 to be in an open configuration.

Figure 7:
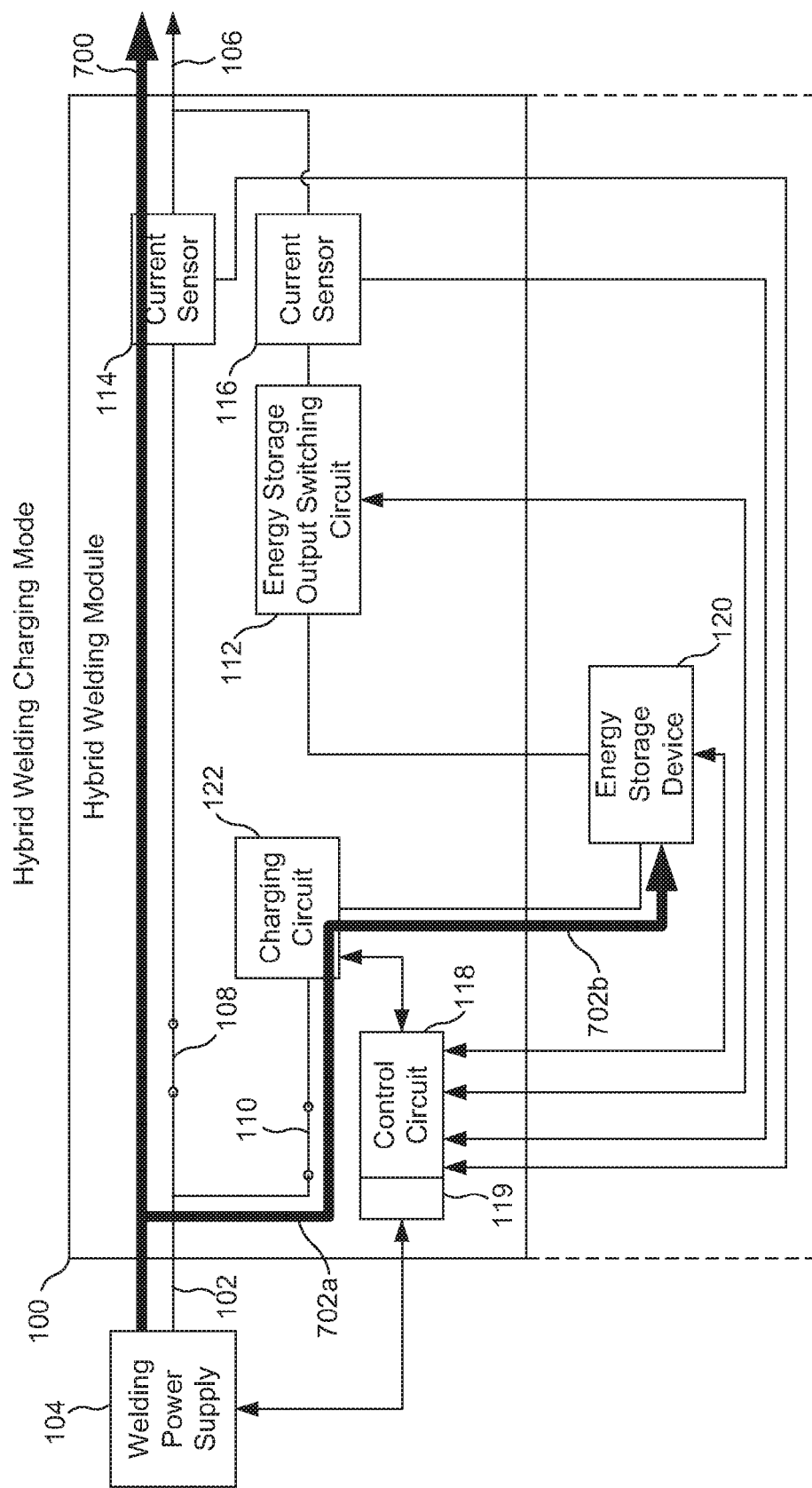
FIG. 7 illustrates current flow in the example hybrid welding module of FIG. 1 during a combination welding-charging mode.

FIG. 7 illustrates current flows 700, 702a, 702b in the example hybrid welding module 100 of FIG. 1 during a Hybrid Welding Charging Mode. In the Hybrid Welding Charging Mode, the control circuit 118 controls both the welding input switch 108 and the energy storage input switch 110 to be in closed configurations such that the welding-type input power 102 can be output via a first current path 700 to the hybrid welding-type output 106 and via a second current path 702a to the energy storage device 120. The charging circuit 122 in the hybrid welding module 100 controls a current flow 702b to charge the energy storage device 120 independent of the welding-type input current 702a, based on the voltage of the energy storage device 120.

Figure 8:
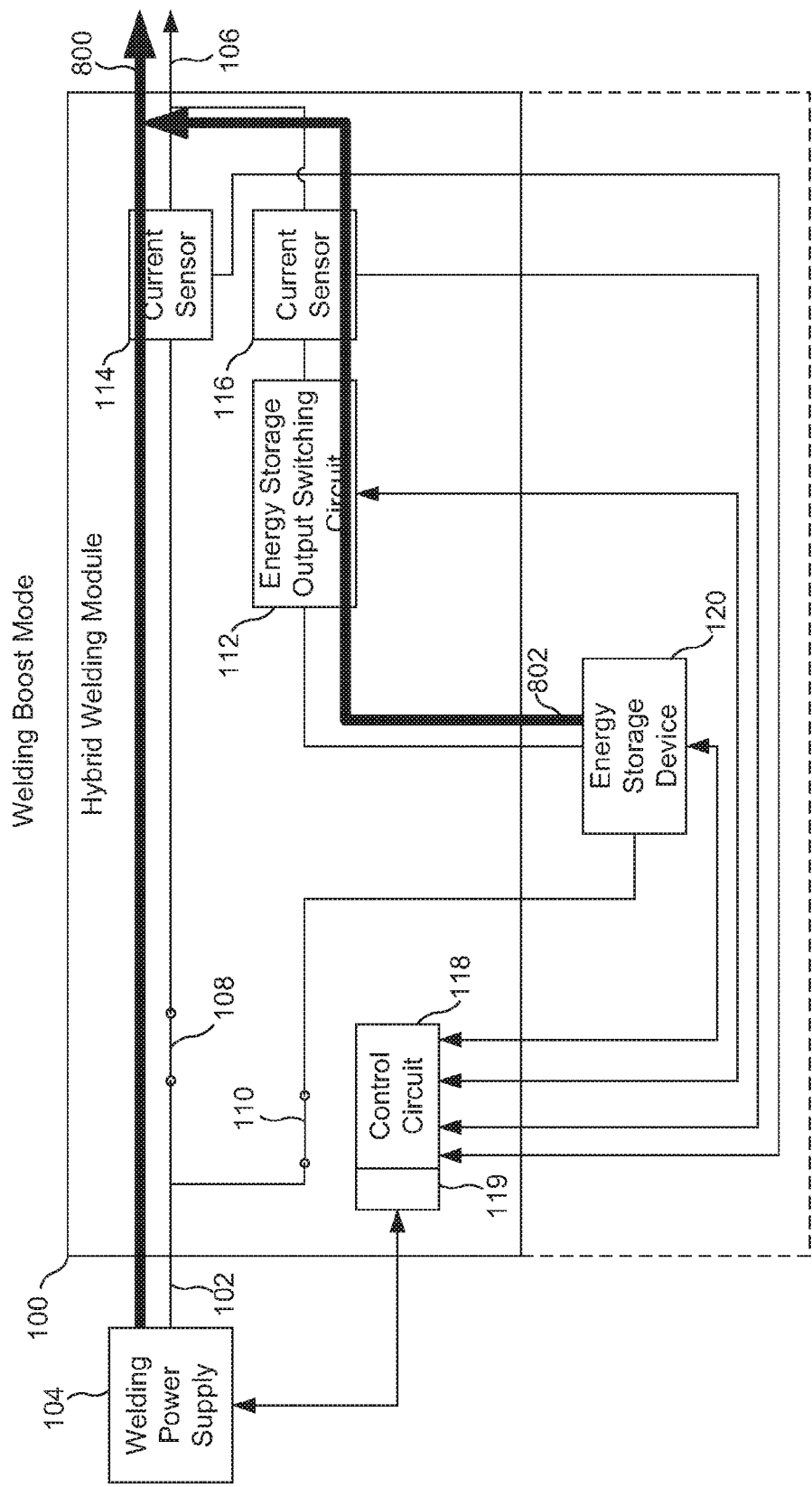
FIG. 8 illustrates current flow in the example hybrid welding module of FIG. 1 during a welding boost mode.

FIG. 8 illustrates current flows 800, 802 in the example hybrid welding module 100 of FIG. 1 during a Welding Boost Mode. In the Welding Boost Mode, the energy storage output switching circuit 112 converts power from the energy storage device 120 to secondary or supplemental output current 802 and outputs the supplemental output current to the hybrid welding-type output 106 for combination with the primary welding-type current provided by the welding power supply 104.

FIG. 11A illustrates an example in which the control circuit 118 of FIG. 8 causes the hybrid welding module 100 to enter the Welding Boost Mode by monitoring the current sensor 114 and comparing the current measured by the current sensor 114 to a commanded current for the weld. In the example of FIG. 11A, the control circuit 118 includes a first current error calculator 1102 that compares power supply current feedback 1104 generated by the power supply 104 (e.g., measuring the current output by the power sensor 114) to a power supply current command 1106 (e.g., the target current for the power supply 104). The power supply current command 1106 is received at the control circuit 118 via the control interface 119.

The difference between the power supply current feedback 1104 and the a power supply current command 1106 is output by the first current error calculator 1102 as a battery current command 1108. The battery current command 1108 is the target current to be provided to the weld by the energy storage device 120 via the energy storage output switching circuit 112. The control circuit 118 includes a second current error calculator 1110 that compares the battery current command 1108 to battery current feedback 1112 from the current sensor 116.

The current error calculator 1110 outputs the difference between battery current command 1108 and the battery current feedback 1112 as a battery output control signal 1114 to a pulse width modulation (PWM) circuit 1116. The PWM circuit 1116 controls the energy storage output switching circuit 112 based on the battery output control signal 1114. In the illustrated example, the PWM circuit 1116 outputs a PWM signal 1118 to the energy storage output switching circuit 112 to control the voltage and/or current output by the energy storage output switching circuit 112. Thus, the example control circuit 118 may implement a feedback loop using the current feedback signals 1104, 1112 and the power supply current command 1106 to output power from the energy storage device 120. When the current falls below the commanded current, the control circuit 118 controls the energy storage output switching circuit 112 to convert energy from the energy storage device 120 to output supplemental current to the hybrid welding-type output 106.

The PWM circuit 1116 may be enabled and/or disabled via an enable signal 1120. Using the enable signal 1120, the energy storage output switching circuit 112 may be enabled and/or disabled for output of energy from the energy storage device 120.

FIG. 11B illustrates an example in which the control circuit 118 of FIG. 8 controls the energy storage output switching circuit 112 based on the temperature, charge state, and/or other characteristics of the energy storage device 120. The control circuit 118 of FIG. 11B includes the first current error calculator 1102, the second current error calculator 1110, and the PWM circuit 1116. The control circuit 118 of FIG. 11B also includes a microcontroller 1122. The microcontroller 1122 is a programmable logic circuit, such as a system-on-chip, a programmable logic device, and/or any other type of logic circuit.

In contrast with the example of FIG. 11A, in the example of FIG. 11B, the current error calculator 1102 provides a welding current error signal 1124 to the microcontroller 1122 (e.g., instead of providing the battery current command 1108 directly to the second current error calculator 1110). The microcontroller 1122 performs one or more software, firmware, and/or hardware-based operations on the welding current error signal 1124 to derive the battery current command 1108. For example, the control circuit 118 may apply one or more of a current change slew rate control, a modification to the welding current error signal 1124 based on the charge state of the energy storage device 120, and/or any other processing. The microcontroller 1122 then provides the resulting battery current command 1108 to the current error calculator 1110.

The control circuits 118 may include analog-to-digital and/or digital-to-analog conversion devices to convert between, for example, sensor data and/or control data.

Figure 9:
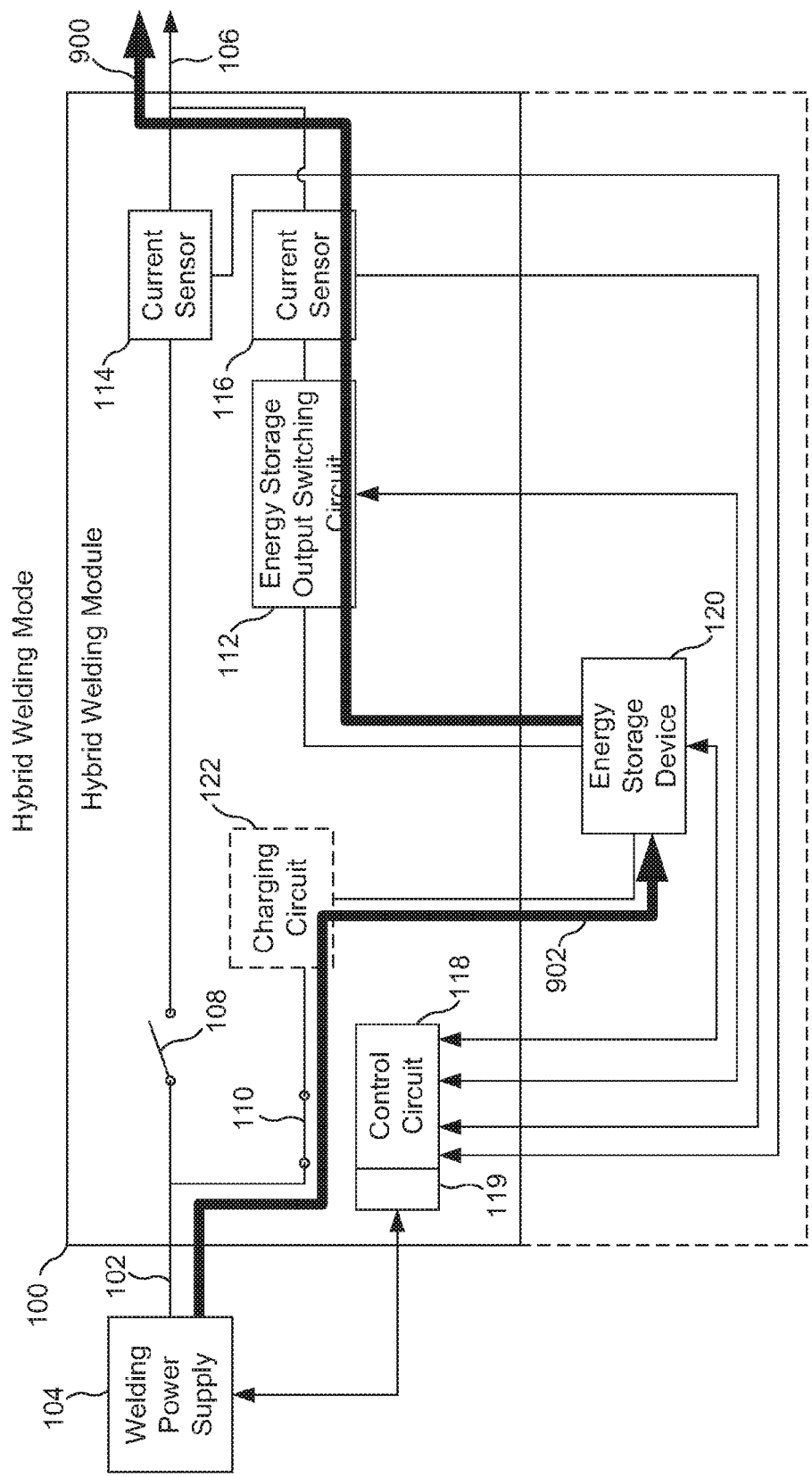
FIG. 9 illustrates current flow in the example hybrid welding module of FIG. 1 during a discharge mode.

FIG. 9 illustrates current flows 900, 902 in the example hybrid welding module 100 of FIG. 1 during a Hybrid Welding Mode. The Hybrid Welding Mode may be used to, for example, supply power to start a welding operation while an engine-driven welder increases speed from idle to running speed.

In the Hybrid Welding Mode, the control circuit 118 controls the welding input switch 108 to be in an open configuration. The control circuit 118 controls the energy storage output switching circuit 112 to output current 900 to the hybrid welding-type output 106.

The control circuit 118 controls the energy storage input switch 110 to be in a closed configuration, thereby providing a load to the welding power supply 104 until the welding power supply 104 is capable of providing the welding power to the hybrid welding-type output 106. For example, the control circuit 118 may control the energy storage output switching circuit 112 to provide initial power to the weld circuit during a start of a weld, and control the welding input switch 108 to output at least a portion of the welding-type input power 102 to the weld circuit after the start of the weld.

Figure 10:
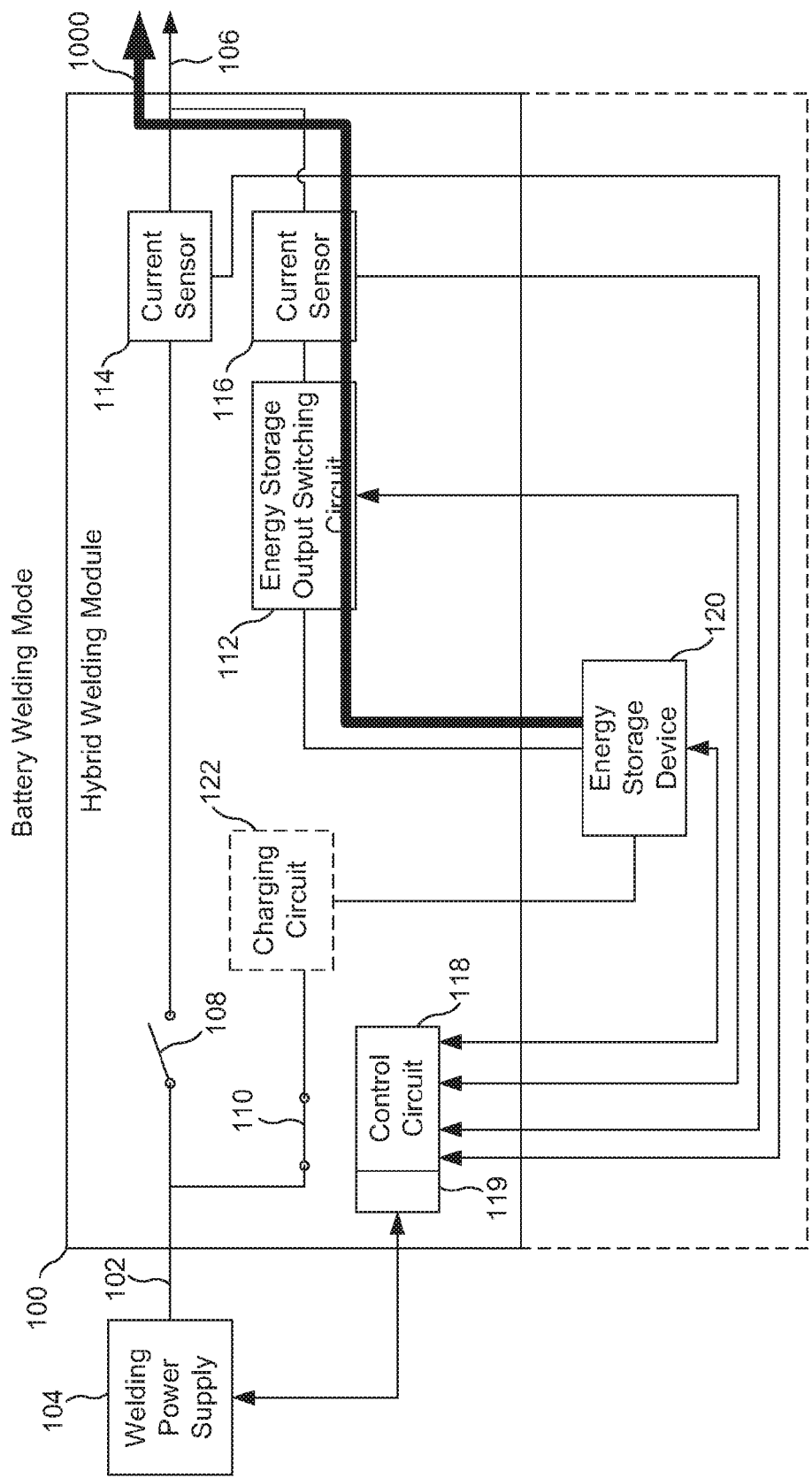
FIG. 10 illustrates a current flow in the example hybrid welding module during a Battery Welding mode.

FIG. 10 illustrates a current flow 1000 in the example hybrid welding module 100 during a Battery Welding mode. As shown in FIG. 10, the current flow is provided using energy from the energy storage device 120. Based on the output voltage of the energy storage device 120 and the weld voltage, the energy storage output switching circuit 112 may boost, buck, and/or otherwise condition the power from the energy storage device 120 to control the current flow.

The energy storage input switch 110 is shown closed in FIG. 10, though energy is not flowing to the charging circuit 122 or the energy storage device 120. For example, the control circuit 118 may control the welding power supply 104 to not output weld power. However, the energy storage input switch 110 may be in an open configuration to prevent weld power from reaching the charging circuit 122.

While both the welding input switch 108 and the energy storage input switch 110 are in closed configurations, the example hybrid welding module 100 may change between the Welding Mode, the Charging Mode, the Hybrid Welding Charging Mode, the Welding Boost mode, the Hybrid Welding Mode, and/or the Battery Welding mode. Changes between modes may be driven automatically by the control circuit 118, by the presence or absence of a welding operation, and/or by a change in the load at the hybrid welding-type output 106 relative to the maximum power that can be provided by the welding power supply 104. For example, when the load decreases below the maximum load of the welding power supply 104, the hybrid welding module 100 may change from the Welding Mode to the Hybrid Welding Charging Mode to charge the energy storage device 120 during the welding operation. Conversely, when the load increases above the maximum load, the hybrid welding module 100 may change from the Welding Mode to the Welding Boost mode and provide additional current via the energy storage output switching circuit 112.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A hybrid welding module, comprising:
  a welding input switch configured to receive welding-type input power and to selectively output the welding-type input power to a weld circuit as first welding-type output power;
  an energy storage input switch configured to receive the welding-type input power and to selectively conduct the welding-type input power to an energy storage device;
  an energy storage output switching circuit to convert energy output by the energy storage device to second welding-type power and to output the second welding-type power to the weld circuit; and
  a control circuit configured to:
  enable charging of the energy storage device by controlling the energy storage input switch to output the welding-type input power to the energy storage device;
  selectively controlling the welding input switch to output the welding-type input power to the weld circuit;
  determine a commanded total welding-type current;
  monitor a first welding-type current through the welding input switch;
  monitor a second welding-type current output by the energy storage output switching circuit; and
  control the energy storage output switching circuit to output the second welding-type power for combination with the first welding-type output power based on the commanded total welding-type current, the first welding-type current, and the second welding-type current.

2. The hybrid welding module as defined in claim 1, further comprising a control interface configured to receive a communication from a welding-type power supply providing the welding-type input power, the communication comprising one or more weld parameters, the control circuit configured to determine the commanded total welding-type current based on the one or more weld parameters.

3. The hybrid welding module as defined in claim 2, wherein the commanded total welding-type current is greater than a rated current output of the welding-type power supply.

4. The hybrid welding module as defined in claim 1, further comprising a control interface configured to communicate with a welding-type power supply providing the welding-type input power, the control circuit configured to transmit a communication to the welding-type power supply to cause the welding-type power supply to provide the welding-type input power while charging the energy storage device and while the welding input switch is controlled to not output the welding-type input power to the weld circuit.

5. The hybrid welding module as defined in claim 4, wherein the control circuit is configured to control the energy storage output switching circuit based on a voltage-amperage curve without changes to the welding-type input power by the welding-type power supply.

6. The hybrid welding module as defined in claim 4, wherein the control circuit is configured to:
detect an end of a welding-type operation based on monitoring the first welding-type current; and
in response to detecting the end of the welding-type operation:
enable the charging of the energy storage device; and
transmit the communication to the welding-type power supply.

7. The hybrid welding module as defined in claim 1, wherein the control circuit is configured to control the energy storage output switching circuit to control a voltage-amperage curve of the second welding-type power.

8. The hybrid welding module as defined in claim 1, wherein the control circuit is configured to control the energy storage output switching circuit to adjust a total welding-type output power based on a voltage-amperage curve, the first welding-type current, and the second welding-type current.

9. The hybrid welding module as defined in claim 1, wherein the energy storage output switching circuit comprises a boost converter to increase a voltage from the energy storage device.

10. The hybrid welding module as defined in claim 1, wherein the energy storage output switching circuit comprises a buck converter to increase a voltage from the energy storage device.

11. The hybrid welding module as defined in claim 1, wherein the control circuit is configured to control the energy storage output switching circuit based on a difference between the commanded total welding-type current and the first welding-type current.

12. The hybrid welding module as defined in claim 1, wherein the energy storage output switching circuit comprises a buck circuit and a boost circuit, the control circuit configured to control the energy storage output switching circuit by controlling at least one of the boost circuit or the buck circuit.

13. The hybrid welding module as defined in claim 1, wherein the control circuit is configured to control the energy storage output switching circuit to output an open circuit voltage when the first welding type input switch is open.

14. The hybrid welding module as defined in claim 1, wherein the control circuit is configured to control the energy storage output switching circuit to provide initial power to the weld circuit during a start of a weld.

15. The hybrid welding module as defined in claim 14, wherein the control circuit is configured to control the welding input switch to output at least a portion of the welding-type input power to the weld circuit after the start of the weld.

16. The hybrid welding module as defined in claim 1, wherein the control circuit is configured to communicate with a welding-type power supply providing the welding-type input power to determine whether to control the energy storage output switching circuit to energize the weld circuit.

17. The hybrid welding module as defined in claim 16, wherein the control circuit is configured to determine that the energy storage output switching circuit is to energize the weld circuit based on at least one of receiving an indication of a welding process type or receiving a remote trigger signal.

18. The hybrid welding module as defined in claim 1, further comprising a charging circuit configured to charge the energy storage device using the welding-type input power.

19. A hybrid welding module, comprising:
a charging circuit configured to charge an energy storage device;
a multi-output power input switch configured to:
receive welding-type input power;
selectively output the welding-type input power to a weld circuit as first welding-type output power; and
selectively output the welding-type input power to the charging circuit, the charging circuit configured to charge the energy storage device using the welding-type input power;
an energy storage output switching circuit to convert energy output by the energy storage device to second welding-type power and to output the second welding-type power to the weld circuit; and
a control circuit configured to:
enable charging of the energy storage device by controlling the multi-output power input switch to output the welding-type input power to the charging circuit;
enable welding by controlling the multi-output power input switch to output the welding-type input power to the weld circuit;
determine a commanded total welding-type power;
monitor a first welding-type current output by the multi-output power input switch to the weld circuit;
monitor a second welding-type current output by the energy storage output switching circuit; and
control the energy storage output switching circuit to output the second welding-type power for combination with the first welding-type output power based on the commanded total welding-type power, the first welding-type current, and the second welding-type current.

20. A hybrid welding module, comprising:
a welding input switch configured to receive welding-type input power and to selectively output the welding-type input power to a weld circuit as first welding-type output power;
a battery;
a charging circuit configured to charge the battery using the welding-type input power;
a battery input switch configured to receive the welding-type input power and to selectively output the welding-type input power to the charging circuit;
a battery output switching circuit to convert energy output by the battery to second welding-type power and to output the second welding-type power to the weld circuit; and a control circuit configured to:

enable charging of the battery by controlling the welding input switch and the battery input switch to output the welding-type input power to the charging circuit;

enable welding by controlling the welding input switch and the battery input switch to output the welding-type input power to the weld circuit;

determine a commanded total welding-type current;

monitor a first welding-type current through the welding input switch;

monitor a second welding-type current output by the battery output switching circuit; and control the battery output switching circuit to output the second welding-type power for combination with the first welding-type output power based on the commanded total welding-type current, the first welding-type current, and the second welding-type current.

* * * * *